United States Patent
Schultz

(10) Patent No.: US 7,321,185 B2
(45) Date of Patent: Jan. 22, 2008

(54) ACTIVE MULTISTABLE TWISTING DEVICE

(75) Inventor: Marc R. Schultz, Louisville, CO (US)

(73) Assignee: United States of America as represented by the Administrator of the National Aeronautics and Space Administration, Washington, DC (US)

( * ) Notice: Subject to any disclaimer, the term of this patent is extended or adjusted under 35 U.S.C. 154(b) by 171 days.

(21) Appl. No.: 11/370,377

(22) Filed: Mar. 6, 2006

(65) Prior Publication Data

US 2007/0120011 A1    May 31, 2007

Related U.S. Application Data

(60) Provisional application No. 60/660,025, filed on Mar. 4, 2005.

(51) Int. Cl.
*H01L 41/08* (2006.01)
*H01L 41/12* (2006.01)
*H02N 2/00* (2006.01)
*H02N 10/00* (2006.01)

(52) U.S. Cl. .............. 310/368; 310/328; 310/330; 310/371; 310/26; 310/307; 310/309

(58) Field of Classification Search ............ 310/324, 310/328, 330–332, 368, 371
See application file for complete search history.

(56) References Cited

U.S. PATENT DOCUMENTS

| | | | |
|---|---|---|---|
| 3,816,774 A * | 6/1974 | Ohnuki et al. ............ 310/332 |
| 4,099,211 A | 7/1978 | Hathaway | |
| 4,383,195 A * | 5/1983 | Kolm et al. ............ 310/330 |
| 4,672,257 A * | 6/1987 | Oota et al. ............ 310/328 |
| 4,915,017 A * | 4/1990 | Perlov .................. 92/5 R |
| 5,241,235 A | 8/1993 | Culp | |
| 5,303,105 A | 4/1994 | Jorgenson | |
| 5,315,204 A * | 5/1994 | Park .................... 310/339 |
| 5,374,011 A | 12/1994 | Lazarus et al. | |
| 5,628,411 A * | 5/1997 | Mills et al. ............ 209/644 |
| 5,861,702 A * | 1/1999 | Bishop et al. ............ 310/330 |
| 5,973,441 A | 10/1999 | Lo et al. | |
| 6,392,331 B1 * | 5/2002 | Sciacca et al. ............ 310/348 |
| 6,545,395 B2 * | 4/2003 | Matsui et al. ............ 310/369 |

(Continued)

FOREIGN PATENT DOCUMENTS

WO    WO-02-25057    *   3/2002

OTHER PUBLICATIONS

Hyer, M.W., "Some Observations on the Cured Shape of Thin Unsymmetric Laminates", Journal of Composite Materials, 1981, p. 175-194.

(Continued)

*Primary Examiner*—Thomas M. Dougherty
(74) *Attorney, Agent, or Firm*—Robin W. Edwards

(57) ABSTRACT

Two similarly shaped, such as rectangular, shells are attached to one another such that they form a resulting thin airfoil-like structure. The resulting device has at least two stable equilibrium shapes. The device can be transformed from one shape to another with a snap-through action. One or more actuators can be used to effect the snap-through; i.e., transform the device from one stable shape to another. Power to the actuators is needed only to transform the device from one shape to another.

27 Claims, 6 Drawing Sheets

U.S. PATENT DOCUMENTS

| | | | |
|---|---|---|---|
| 6,847,155 B2 * | 1/2005 | Schwartz et al. | 310/328 |
| 6,979,937 B2 * | 12/2005 | Masters et al. | 310/332 |
| 2001/0043027 A1 * | 11/2001 | Hellbaum et al. | 310/330 |
| 2003/0029705 A1 * | 2/2003 | Qiu et al. | 200/181 |
| 2004/0004532 A1 * | 1/2004 | Davis et al. | 337/53 |
| 2004/0050674 A1 | 3/2004 | Rubel | |
| 2005/0023933 A1 | 2/2005 | Magnussen et al. | |
| 2006/0038643 A1 * | 2/2006 | Xu et al. | 335/78 |

OTHER PUBLICATIONS

Hyer, M.W., "Calculations of the Room-Temperature Shapes of Unsymmetric Laminates," Journal of Composite Materials, 1981, p. 296-310.

Dano, M.L. and Hyer, M.W., "Thermally-Induced Deformation Behavior of Unsymmetric Laminates," International Journal of Solids and Structures, 1998, vol. 35 ( No. 17), p. 2101-2120.

Hufenbach, W. Gude, M., and Kroll, L., "Design of Multistable Composites for Application in Adaptive Structures," Composites Science and Technology, vol. 62 ( No. 16), p. 2201-2207, no date given.

Luo, J.J. and Daniel, I.M., "Thermally-Induced Deformation of Asymmetric Composite Laminates," Proceedings of the 18th Annual Technical Conference of the American Society for Composites, 2003, p. 128-136.

Cho, M., Kim, M.H., Choi, H.S., Chung, H.C., Ahn, K.J., and Eom, Y.S., "A Study on the Room-Temperature Curvature Shapes of Unsymmetric Laminates Including Slippage Effects," 1998, vol. 32 ( No. 5).

Ren. L, Parvizi-Majidi, A. and Li. Z, "Cured Shape of Cross-Ply Composite Thin Shells," Journal of Composite Materials, 2003, vol. 37 ( No. 20), p. 1801-1820.

Schultz, M.S. and Hyer, M.W., "A Morphing Concept Based on Unsymmetric Composite Laminates and Piezoceramic MFC Actuators," Proceedings of the 45th AIAA/ASME/ASCE/AHS/ASC Structures, no date given.

Schultz, M.R. and Hyer, M.W., "Snap-Through of Unsymmetric Cross-Ply Laminates Using Piezoceramic Actuators," Journal of Intelligent Material Systems and Structures, vol. 14 ( No. 12), p. 795-814, no date given.

Dano, M.L. and Hyer, M.W., "Snap-Through of Unsymmetric Fiber-Reinforced Composite Laminates," International Journal of Solids and Structures, p. 175-198, no date given.

Murphey, T.W. and Pellegrino S., "A Novel Actuated Composite Tape-Spring for Deployable Structures," Proceedings of the 45th AIAA/ASME/ASCE/AHS/ASC Structures, no date given.

Iqbal, K. and Pellegrino, S., "Bi-Stable Composite Shells," Proceedings of the 41st AIAA/ASME/ASCE/AHS/ASC Structures, no date given.

Galletly, D.A. and Guest, S.D., "Bistable Composite Slit Tubes. II. A Shell Model," International Journal of Solids , p. 4503-4516, no date given.

Santer, M.J. and Pellegrino, S., "An Asymmetrically-Bistable Monolithic Energy-Storing Structure," Proceedings of the 45th AIAA/ASME/ASCE/AHS/ASC Structures, no date given.

Schioler, T. and Pellegrino, S., "Multi-Configuration Space Frames," Proceedings of the 45th AIAA/ASME/ASCE/AHS/ASC Structures, no date given.

Seffen, K.A., "Bi-Stable Concepts for Reconfigurable Structures," Proceedings of the 45th AIAA/ASME/ASCE/AHS/ASC Structures, no date given.

Kebadze, E., Guest, S.D., and Pellegrino, S., "Bistable Prestressed Shell Structures," International Journal of Solids and Structures, p. 2801-2820, no date given.

Wilson, J.R., "Active Aeroelastic Wing: A New/Old Twist on Flight," Aerospace America, vol. 43 ( No. 1), p. 27-30, no date given.

Phillips, W.F., "New Twist on an old Wing Theory," Aerospace America, vol. 40 ( No. 9), p. 34-37, no date given.

* cited by examiner

ACTIVE MULTISTABLE TWISTING DEVICE

ORIGIN OF THE INVENTION

The invention described herein may be manufactured and used by or for the Government of the United States of America for governmental purposes without the payment of any royalties thereon or therefor. Pursuant to 35 U.S.C. §119, the benefit of priority from provisional application 60/660,025, with a filing date of Mar. 4, 2005, is claimed for this non-provisional application.

BACKGROUND OF THE INVENTION

1. Field of the Invention

This invention relates to multistable structures. More specifically, the invention is an active multistable device that can produce a change in twist when actuated.

2. Description of the Related Art

Many articulating and morphing structures use multiple parts and often use complicated actuation mechanisms such as hydraulic actuators, screws, or other devices to provide geometric change in the structure through the use of hinges, telescoping sections, and other mechanisms. For example, in many fixed wing aircraft, the wings provide stable lift, while hydraulically-operated flaps change lift and drag, and control is accomplished by moving the rudder and ailerons, which are also hydraulically operated.

In an effort to simplify and lighten structures, components that are both structural and can change shape to meet some change in operational needs, have been investigated. Many of these concepts depend on a continuous supply of power to piezoceramic or shape memory alloy (SMA) actuators to deform the structure elastically from its natural, and unique, equilibrium configuration to a 'near-by' configuration. However, if a structure that possessed multiple equilibrium configurations, i.e., a multistable structure, was used, power would be needed only to change the shape, not to hold the structure in the alternative shape.

SUMMARY OF THE INVENTION

Accordingly, it is an object of the present invention to provide a system and method for accomplishing structural morphing.

Another object of the present invention is to provide a morphing structure capable of large change in shape with small energy input.

Another object of the present invention is to provide a system for transforming a structure from one equilibrium position to another through snap-through action.

Other objects and advantages of the present invention will become more obvious hereinafter in the specification and drawings.

In accordance with the present invention, two similarly shaped, such as rectangular, shells are attached to one another such that they form a resulting thin airfoil-like structure. The resulting device has at least two stable equilibrium shapes. The device can be transformed from one shape to another with a snap-through action. One or more actuators can be used to effect the snap-through; i.e., transform the device from one stable shape to another. Power to the actuators is needed only to transform the device from one shape to another.

DETAILED DESCRIPTION OF THE INVENTION

Figure 1:
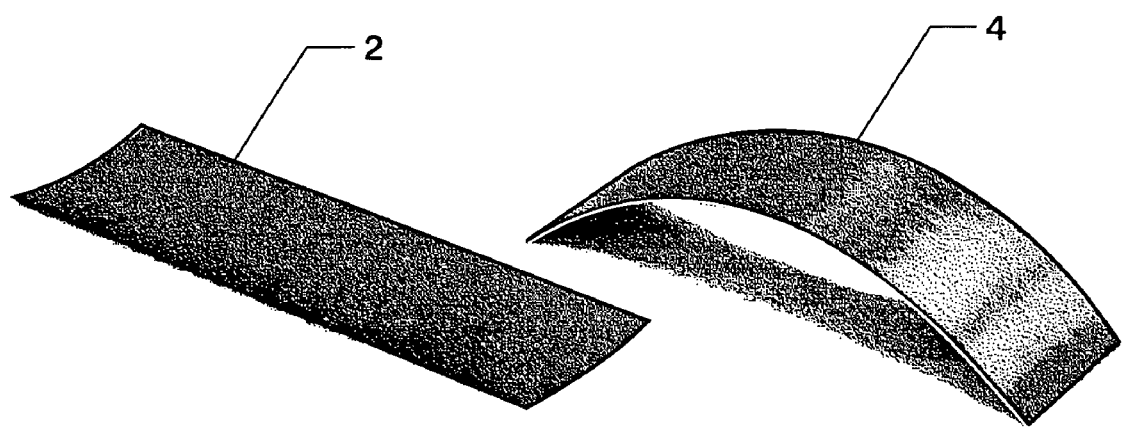
FIG. 1 shows two stable cylindrical constituent shells.
Figure 1:
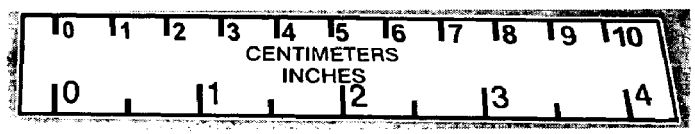
Figure 2A:
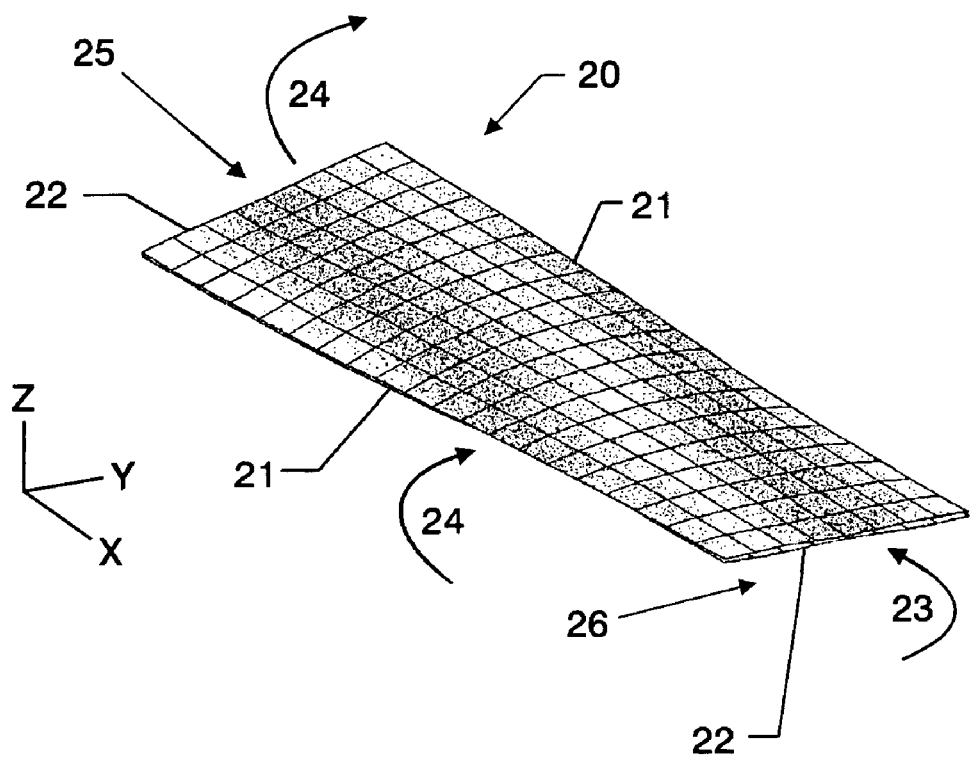
FIGS. 2A and 2B are analytical representations of a multistable device comprised of two constituent thin composite shells.
Figure 2B:
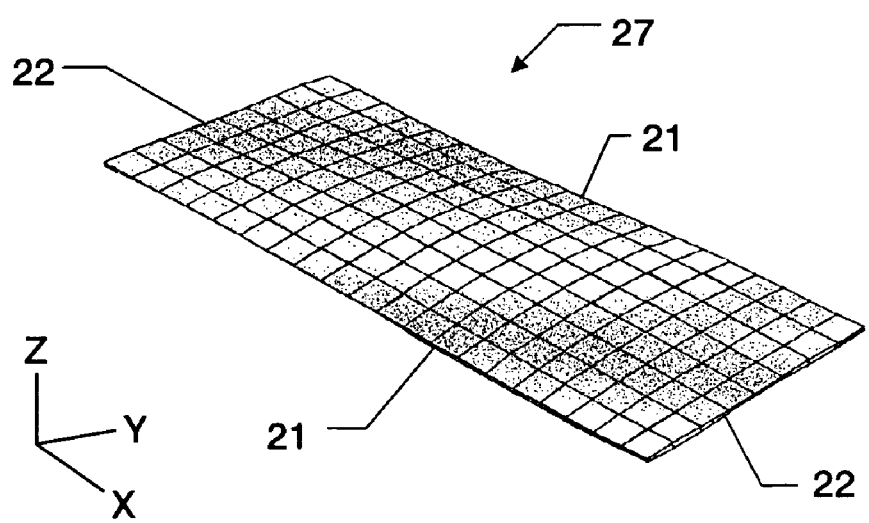

In one embodiment of the present invention, two similar-shape, such as rectangular, unsymmetric composite laminates, each having two stable cylindrical shapes, such as the shapes 2 and 4 shown in FIG. 1, are attached to one another such that they form a multistable clamshell-type structure having two stable shapes, such as 20 and 27 illustrated in FIGS. 2A and 2B. The laminates are aligned so that they are convex outward, touching along the long edges 21, and the structure is open along the short edges 22. As the short edges are pressed together, twist curvature develops along the long axis x, while the overall convexity of the structure is maintained. The structure can be transformed from one with positive twist curvature to one with negative twist curvature by applying opposing twist moments, such as 23 or 24, to the short edges 22. As the structure is transformed from one shape to another, one or more of the short edges 22 slide with respect to each other, the short-end attachment of the two constituent laminates allowing motion between the two. The two constituent laminates can be connected such that each constituent laminate can rotate in plane relative to the other laminate, or connected such that the two constituent laminates are clamped together on one end, but allowed to slide relative to each other on the other end. Actuators, such as off-the-shelf piezocomposite actuators can be used to transform the device from one stable shape to another. The frequency is generally limited by the resonant frequency of the device and the actuation that is used. Once resonance is reached, the device will generally bend globally rather than twist. Various types of actuators can be used, including piezoelectric, shape memory alloy, magnetorestrictive, ferroelectric, shape memory polymer and electroactive polymer. Piezoelectric actuators can include piezoceramic and piezopolymer in addition to piezocomposite. Instead of actuators, conventional hydraulics or motors could also be used.

Geometries other than rectangles can be used and the amount of twist curvature obtained can be tailored by variations in planform geometry of the constituent laminates, laminate stacking sequence, and how closely the constituent laminates are pressed together at the short edges. Both the material and thickness can be tailored to meet particular requirements. Thickness will be dependent on performance; i.e., if too thick, the shell will fail before the bending requirements are met. If there is a variation in how closely the laminates are pressed together at the short edges, continuous control can be obtained.

Large shape change can be accomplished with small energy input and without complicated actuators such as screws, gears or hydraulics. Instead of power being needed to elastically deform the shell over its entire range, power is only needed to get the shell from one stable configuration to another. While power is only needed to transform the structure from one shape to another, the shape can be fine-tuned with a continuous application of power. Because the whole structure serves as both the base structure and the control surface, a reduction in weight of the overall structure is possible.

By way of illustrative example, two similar-shape rectangular graphite/epoxy crossply unsymmetric laminates, each having two stable cylindrical shapes as illustrated in FIGS. 1A and 1B, form a multistable clamshell-type structure. The composite laminates each consist of two layers of unidirectional graphite/epoxy, one layer with a 0° fiber angle and the other with a 90° fiber angle. The laminates were manufactured on a flat tool, and, in order to cure the epoxy, processed at an elevated temperature. The processing temperature was that recommended for the epoxy cure cycle. As the laminate cooled from its processing temperature, the asymmetric stacking sequence and thermally-induced stresses caused out-of-plane displacements that led to the existence of multiple equilibrium shapes. The multistable device was formed by lining up the laminates (in the shape of laminate 2 shown in FIG. 1) so that they were convex outward, were lined up and touching along the long edges, and the structure was open along the short edges. As the short edges were pressed together, twist developed along the long axis of the structure, while the overall convexity of the structure was maintained. The structure can then be transformed from one with positive twist to one with negative twist by applying opposing twist moments 23 or 24 to the short edges. As the structure is transformed from one shape to another, one or more of the short edges slide with respect to each other. Therefore, the short-end attachment of the two laminates must allow motion between the two. For example, the laminates can be connected such that each laminate can rotate in plane relative to the other laminate (as if they were pinned in the middle of each short side), such as by the use of one or more suitable fasteners such as rivets, pins, bolts or screws, compliant glue, or a rubber-type connection, or connected such that the two laminates are fixed along one short end, such as by use of a suitable adhesive, clamps or welds, but allowed to slide relative to each other on the other short end.

A Series 300×300 mm [0/90]$_T$ unsymmetric composite laminates were autoclave-manufactured using AS4/3501-6 graphite/epoxy prepreg. The laminates, in the two stable cylindrical shapes, had a radius of curvature of about 90 mm at room temperature. Several of these laminates were then cut to a series of smaller sizes: 44.5×140. mm (1.75×5.5 in.), 41.3×140. mm (1.625×5.5 in.), and 50.8×254.0 mm (2×10 in.). Two shells of each of these sizes were assembled by riveting the short ends together, resulting in three composite twisting devices. One rivet was positioned in the approximate middle along each short edge.

Figure 3:
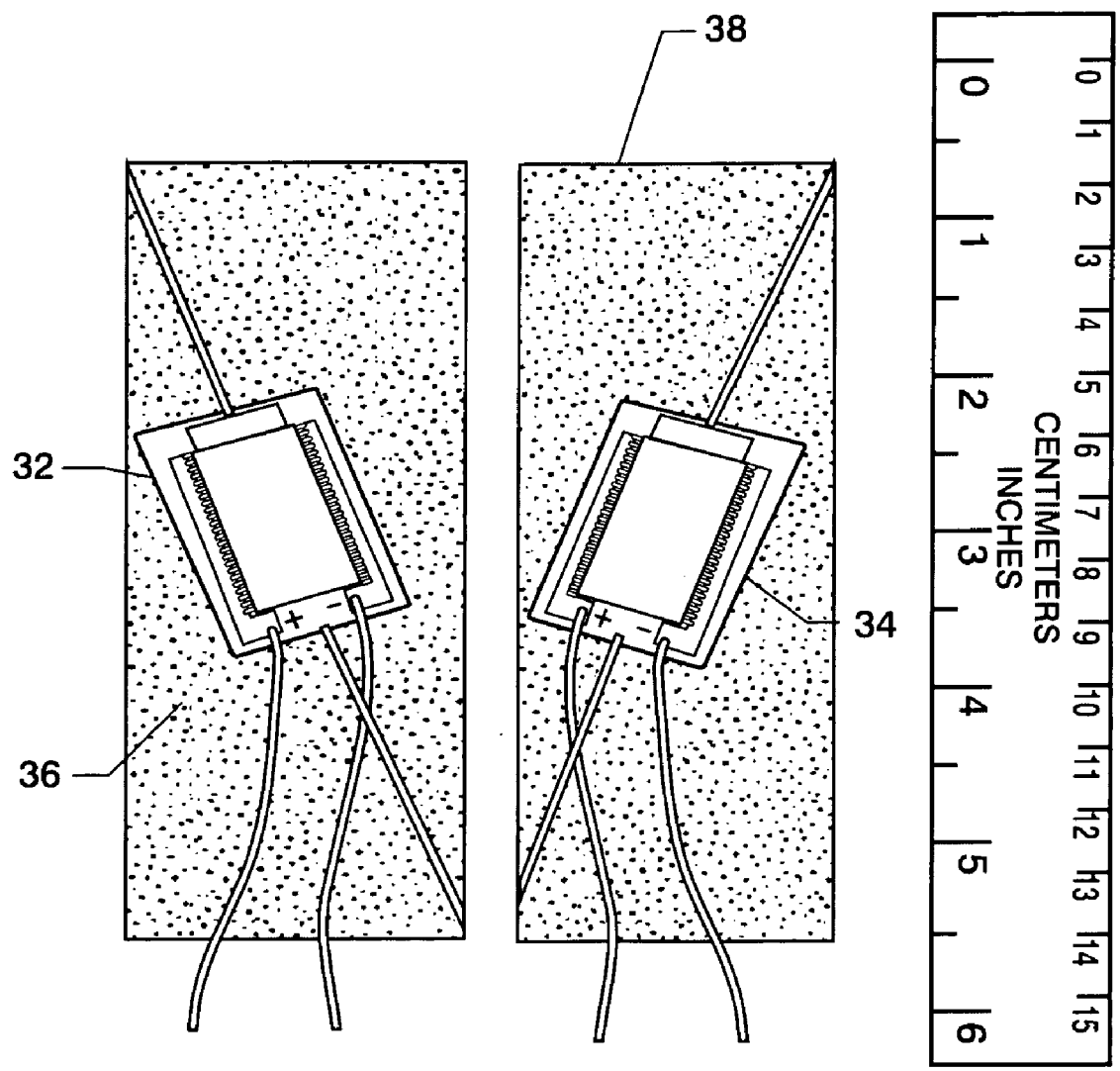
FIG. 3 illustrates the placement of actuators on constituent shells.

An active device was also constructed. Two Macro Fiber Composite actuators (MFCs), which are orthotropic piezocomposite actuators, described in U.S. Pat. No. 6,629,341 "Method of Fabricating a Piezoelectric Composite Apparatus," and obtained from Smart Material Corporation (Part number M2814 P1) were used to effect the snap-through twisting action. The actuators had an active area of 14×28 mm, and were vacuum-bag bonded to the laminates (on what would be the inside of the device) using LOCTITE® HYSOL® E-120HP epoxy. The tool used in the vacuum-bag bonding was curved in order to preserve the curvature of the laminates as the actuators were bonded. Once the actuators were bonded to the laminates, a small strip (about 3 mm) of 3M™ 467 "Hi Performance" adhesive was applied along one of the short edges of one of the laminates. The edge with the adhesive and the corresponding edge of the other laminate were lined up and pressed together to bond the two edges together. The other end of the now-combined device was lightly clamped in a fixture that allowed some movement of the laminates with respect to each other. The placement of the actuators 32 and 34 on the constituent laminates 36 and 38 is illustrated in FIG. 3. Although in this example, one actuator was mounted on each shell, other actuation can be used based on specific actuation requirements. A single actuator could be used on only one shell, or multiple actuators on each shell could be used. Additionally, one could actuate from one end. The actuation used will vary depending on factors such as the size of the actuator(s) being used, the size of the shells, the type of actuator(s) used, and the desired response. For example, if shape memory alloys are being used, it may be more likely that multiple actuators would be needed. To make the device active, each actuator was connected to a high voltage supply and the actuators were operated using opposing voltages so that both actuators contributed to the shape change. The voltage required will depend on such factors as the actuators, the shell geometry and the shell material. The device could be transformed from one shape to the other and back again at frequencies up to 10 Hz, and with tip-angle change of about ±5°. In general, both the maximum frequency and the tip-angle change were a function of how the device was constructed, and both frequency and tip-angle can be tailored for specific applications.

Figure 4A:
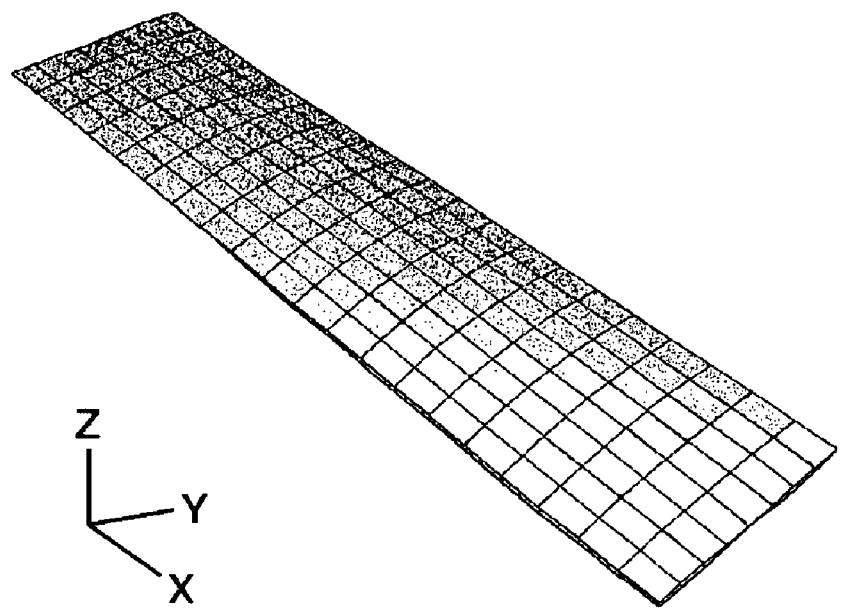
FIGS. 4A and 4B are analytical representations of a multistable device comprised of two constituent thin steel shells.
Figure 4B:
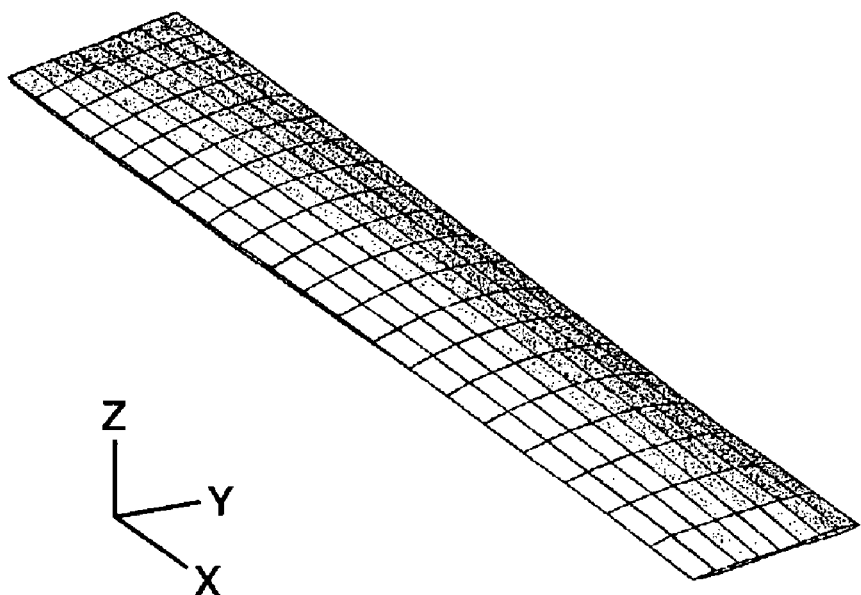

Isotropic materials can also be used. By way of illustrative example, a device (approximately 254×50.8 mm) constructed of two steel cylindrical shells was shown to have two stable shapes having different twist curvatures as illustrated in FIGS. 4A and 4B. Like the composite device, the device could be transformed from one stable shape to the other by a simple snap-through action.

The use of isotropic materials can provide many advantages. Since most engineering materials can be considered isotropic, the range of materials that can be used by a designer to tailor the material selection to the specific application is greatly expanded. Because the initial curvatures of the isotropic cylindrical shells used in the twisting device are not sensitive changes in temperature or humidity (as they are for the unsymmetric graphite-epoxy laminates), the operational characteristics could be consistent over a wide range of environmental conditions. Isotropic materials may also allow for simpler and/or less expensive manufacturing. In addition, quasi-isotropic or other composite laminates could also be used.

Quasi-static analysis was completed using ABAQUS®/ Explicit software. In the analyses, the devices were assembled with a combination of boundary conditions and connector elements. Further details of the analysis are provided in Schultz, M. R., "A New Concept for Active Bistable Twisting Structures," *Proceedings of SPIE Volume 5764, Smart Structures and Materials* 2005: *Smart Structures and Integrated Systems*, edited by Alison B. Flatau, 2005, pp. 241-252, incorporated herein by reference in its entirety.

Three metrics were used for comparison of the analytic model with the experimental devices, and for comparison between analytical cases with different geometric input parameters. These metrics were the tip-angle, the central thickness of the devices, and the magnitude of the axial moment applied to the tip that is needed to cause snap-through. These metrics were chosen because they represent a way to visualize two of the important characteristics of the devices, namely, the shape of the device in the stable configurations, and the control effort required to transition between the two configurations. The tip-angle is defined herein as the difference in angle between the root-end 25 and the tip-end 26 of the device. However, because this angle is positive in one of the stable configurations (FIG. 2B) and negative in the other (FIG. 2A), the change in tip-angle between the two states is double this value. The snap-through moment 23 or 24 is defined herein as the applied moment when the displacements of the tip end corners cross each other on a displacement vs. time plot, and represents how much actuation authority is needed to activate the laminate or isotropic material, and the amount of in-service, or external, loading that can be withstood before snap-through is unintentionally triggered.

A series of bistable twisting composite devices were analyzed to compare with the experimental devices, and to examine how changes in geometry affect the shape and actuation response of the device. As with the experimental devices, the analytical composite devices were modeled to consist of two $[0/90]_T$ graphite-epoxy composite laminates.

In order to model the device assembly and actuation of the composite devices, the analysis was broken into three steps. The two equilibrium shapes of the baseline modeled device, and the coordinate system are shown in FIGS. 2A and 2B. A combination of connector elements and boundary conditions were used to approximate the assembly of the experimental devices. At the beginning of the first step, the laminates are flat, stacked one on top of the other, and considered to be at the elevated processing temperature. Link connector elements, which provide a pinned rigid link between two nodes, were used to hold the midpoints of the short ends together. Zero-displacement boundary conditions were used to prevent rigid-body motion. In step I, the temperature was reduced from the composite processing temperature to the operational temperature, which induced the necessary out-of-plane displacements. A small moment was applied to the tip of the device for a short time at the beginning of the step in order to force the device into one particular stable twist configuration. A viscous pressure coefficient of 500 N·s/m$^3$ was initially applied to the outside faces, and then reduced to zero to damp out vibration and enable the program to find steady state solutions. Step II of the model considered the actuation of the bistable devices through the application of an axial moment (in the x-direction) to the tip of the device. The additional boundary conditions of zero z-direction velocity at the root-end corners were used to counteract the tip end applied moment and limit the root-end motion. The viscous pressure was zero during the second step to prevent the damping from artificially increasing the resulting snap-through moment. In step III, the additional boundary conditions from step II were removed, and the viscous pressure was again used to find the steady-state solution of the second stable configuration.

In order to verify that the finite-element analysis accurately predicted the assembled shapes of the bistable twisting devices, the analysis was first run with geometry and material properties consistent with the three experimental devices. The geometry and property values for what is considered the baseline case are given in Table I, and the analysis using these values serves as a baseline with which analyses with different input values were compared.

TABLE I

Composite Model Input Values

| Property | Baseline Values | Modified Values |
|---|---|---|
| $E_1$, GPa | 140 | |
| $E_2$, GPa | 13 | |
| $G_{12}$, GPa | 6.6 | |
| $G_{13}$, GPa | 6.6 | |
| $G_{23}$, GPa | 4.0 | |
| $\nu_{12}$ | 0.3 | |
| density, kg/m$^3$ | 1520 | |
| $\alpha_1$, °C.$^{-1}$ | $-0.8 \times 10\text{-}6$ | |
| $\alpha_2$, °C.$^{-1}$ | $29.0 \times 10\text{-}6$ | |
| length, m | 0.140 | |
| width, m | 0.0445 | |
| $\Delta$T, C. (curvature, m$^{-1}$) | $-125$ (11.9) | $-113(10.6), -175(16.9)$ |
| laminate thickness, mm (corresponding $\Delta$T, ° C.) | 0.3 | $0.2(-84), 0.4(-167)$ |
| Root-end spacing, mm | 0 | 2, 4 |

The change in temperature from the processing temperature of the composite, $\Delta$T, that was used in the model was not the actual processing $\Delta$T, but rather a value chosen such that a model of the laminates had the same major curvature as the experimental laminates. In other words, the analytical temperature change was chosen in order to match the major curvature of an experimental laminate with the major curvature of a model of that laminate. This was necessary because many factors, analogous to temperature change, such as hygrothermal effects and chemical shrinkage, act to contribute to the shape of the unsymmetric laminates. The effects of all of these factors were incorporated into the temperature change in the analysis. The three experimental devices differed only in the size of the individual laminates used to create the devices. To quantitatively compare these experimental devices to the model, the tip-angle and the thickness at the center of the device, that is the device at its thickest point, were measured. The experimental and predicted tip-angles and midpoint thicknesses are shown in Table II, and show excellent agreement between the model and experimental shapes.

TABLE II

Shape Comparison of Model Input Values

| | Experimentally Measured | | Finite-Element Prediction | |
|---|---|---|---|---|
| Device Description | Tip-angle (degrees) | Midpoint Thickness (mm) | Tip-angle (degrees) | Midpoint Thickness (mm) |
| 140 × 44.5 mm composite (baseline) | 13 | 5.3 | 12.8 | 5.5 |
| 140 × 41.3 mm composite | 12 | 4.9 | 12.5 | 5.0 |
| 254 × 50.8 mm composite | 19 | 8.6 | 19.3 | 8.5 |
| 203 × 44.5 mm steel | 16 | 7.6 | 13.0[1] 16.7[2] | 6.2[1] 7.2[2] |

[1]shell curvature, $\kappa = 11.2$ m$^{-1}$
[2]shell curvature, $\kappa = 13.2$ m$^{-1}$ For the tip-angle, the predictions are all within one degree of the corresponding experimental values, and the predicted midpoint thicknesses are all within 0.2 mm of the experimental values. There was very good qualitative agreement between the experimental and analytical shapes. Once the predicted shapes had been successfully compared with the experimental devices, the analysis was next used to predict how changes in some of the geometric parameters would change the shape and behavior of these devices.

Figure 5A:
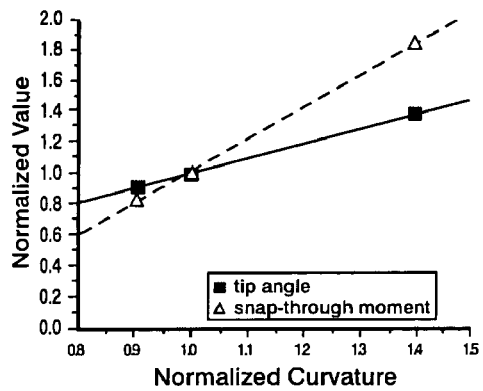
FIGS. 5A, 5B, 5C and 5D show analytical results for an exemplary composite multistable device.

The parameters that were varied were the major curvatures of the unassembled laminates, the thickness of the laminates, and the root-end spacing. The variation in the curvature was accomplished by varying the $\Delta T$. In addition, because the objective was to vary only one parameter during each run, and because varying the thickness of an unsymmetric laminate changes the curvatures of the cooled laminate, when thickness was varied, $\Delta T$ was also varied in order to make the major curvature of the unassembled cooled laminates the same. Finally, the root-end spacing is a measure of how closely the laminates at the root-end are held together. Because of the cooled curvature of the individual laminates, even when the root-ends were held apart in this study, the edges were still in contact. The modified values used are given in Table I. The results are presented in FIGS. 5A-5D. All values except the root-end spacing are normalized with respect to the corresponding value from the baseline analysis. The symbols represent the values found for each analysis, while the lines are linear fit lines of those values and are shown to help visualize the trends in each plot. Some interesting trends are evident. In FIG. 5A, the normalized tip-angle and normalized snap-through moment are plotted verses the normalized curvature. Increasing the laminate curvatures increased tip-angle for the twisting device. As would be expected, increasing the curvature also increased the moment needed to snap the device from one stable shape to another.

Figure 5B:
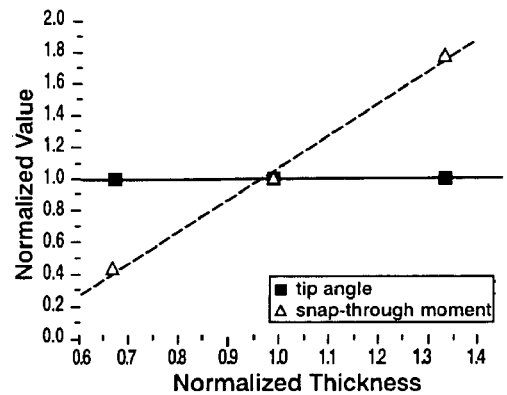
Figure 5C:
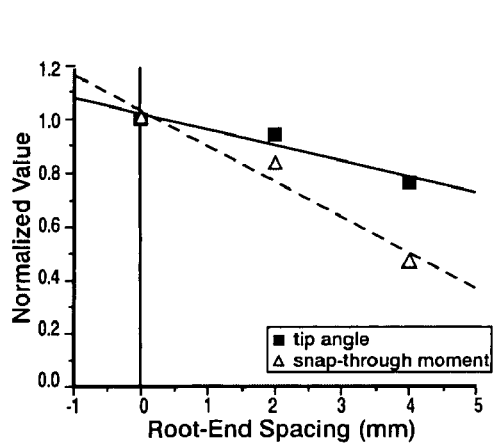
Figure 5D:
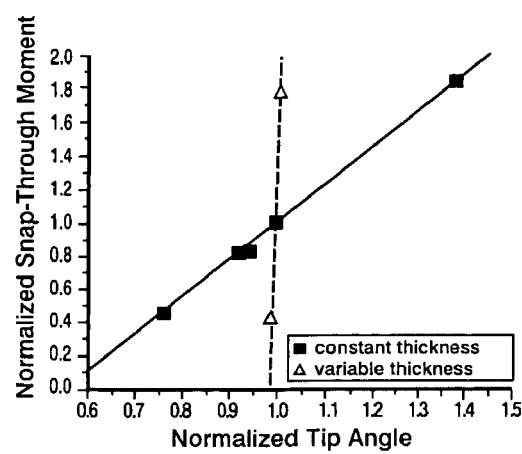

FIG. 5B shows laminate thickness effect on the tip-angle and snap-through moment. Recall that in order to isolate the effect of layer thickness, the $\Delta T$ in the models was varied so that the curvatures of the separate laminates remained the same as those for the baseline laminate. The tip-angle also remained fairly constant with changing layer thickness, presumably because the unassembled curvatures were all basically the same. However, as should be expected, the snap-through moment increased with increasing layer thickness. FIG. 5C shows the relationship of snap-through moment to root-end spacing. Both tip-angle and snap-through moment decrease with increasing root-end spacing. Finally, in FIG. 5D, the normalized snap-through moment is plotted against the normalized tip-angle for all of the values that are shown in FIGS. 5A-5C. The square symbols represent the data points for the cases that used the baseline thickness, while the triangular symbols represent the cases where the thickness was different from the baseline thickness. As shown, if the laminate thickness was held constant, the relationship between the snap-through moment and the tip-angle was quite linear as the laminate curvatures and root-end spacing were changed. This relationship indicates that if thickness is held constant and other parameters are varied, the magnitude of tip-angle will provide a reasonable estimate of the moment necessary to effect the snap-through change.

The parametric study shows a direct relationship between the curvatures of the individual laminates and the tip-angle of the assembled device. Second, for a given laminate thickness, the relationship between the snap-through moment and tip-angle is direct and linear. Third, if the curvatures of the individual laminates are held constant, changing the laminate thickness will change the snap-through moment without changing the tip-angle. These observations provide some useful insight into how bistable twisting devices may be tailored to meet the specific needs of specific applications.

The composite bistable twisting devices can be tailored to meet the needs of many applications. However, in some applications there may be a need to overcome several shortcomings (such as the temperature and humidity dependence) in relying upon laminate asymmetry to produce the required curvatures.

A series of steel bistable twisting devices were modeled to examine how geometry changes to the individual constituent shells would affect the shape and actuation properties. In addition, the results of such models were compared with the steel experimental device, and the results of the composite parametric study.

Although the basic modeling approach used for the steel devices was similar to that used with the composite devices, there were several significant differences. Because the steel shells were initially curved, it would have been more difficult to use connector elements to assemble the steel devices. Therefore, in the analysis of the steel devices, only boundary conditions are used for the assembly of the shells into the bistable devices. Also, throughout the analysis rigid-body displacements and x-direction rotation of the lower shell root-end central node, as well as displacements in the y- or z-directions of the tip end central node, were not allowed. Similarly, on the upper shell, the central node of the root-end was held fixed in the x- and y-directions and the central node of the tip-end was held fixed in the y-direction. In the first step of the model, the central end nodes of the upper shell were moved to bring the upper and lower shells into contact by specifying the z-direction displacement. As in the composite models, moments to the tip-end of the device were used to place the device into the proper configuration in the first step and to cause the snap-through in the second step. However, since the steel models do not use connector elements to join the upper and lower shell, half of the tip moment is applied to each shell.

The finite-element analysis was used the compare the shape (tip-angle and midpoint thickness) with the experimental values. For the baseline steel case, an effort was made to approximate the actual experimental steel device. The values shown in Table III are the corresponding inputs to the model. However, because the initial curvature of the steel material used in this study was not precisely uniform, it was difficult to determine with certainty the actual experimental curvatures. Therefore, when comparing the modeling shape predictions to the experimental shape, two different curvatures were used in the model.

TABLE III

Steel Model Input Values

| Property | Baseline Values | Modified Values |
|---|---|---|
| E (GPa) | 207 | |
| ν | 130.3 | |
| Density (kg/m$^3$) | 7850 | |
| L$_x$ (m) | 0.203 | |
| L$_y$ (m) | 0.0445 | |
| Shell curvature, K (m$^{-1}$) | 11.2 | 13.2, 9.85 |
| Shell thickness (mm) | 0.324 | 0.200, 0.250, 0.350, 0.400 |
| Root-end spacing (mm) | 0 | 2, 4 |

The two analytical stable shapes from the baseline steel case are shown in FIGS. 4A and 4B. There was excellent qualitative agreement between the analytical shapes and the corresponding experimental shapes. The predicted and actual tip-angles and midpoint thicknesses are shown in Table II, and show fairly good agreement. The actual tip-angle was within the two predicted tip-angles. In contrast, the actual midpoint thickness is outside the predicted range. However, because low-grade steel was used in the experimental device, some plastic deformation occurred during assembly of the device. This plastic deformation was not accounted for in the models and may be responsible for some of the difference that is seen.

Figure 6A:
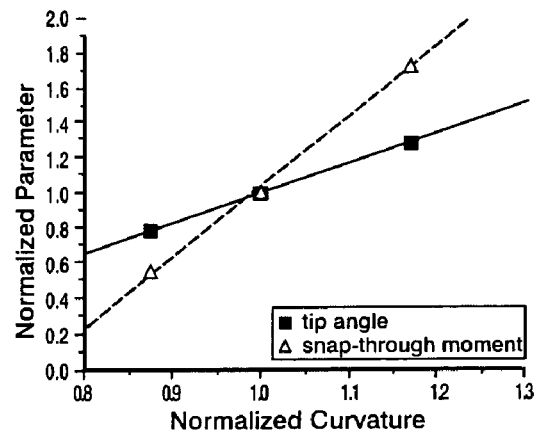
FIGS. 6A, 6B, 6C and 6D show analytical results for an exemplary steel multistable device.
Figure 6B:
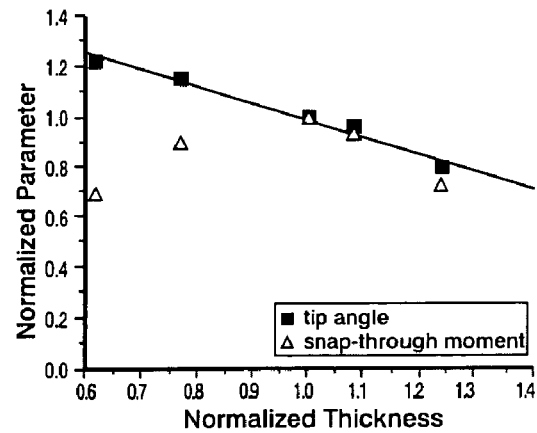
Figure 6C:
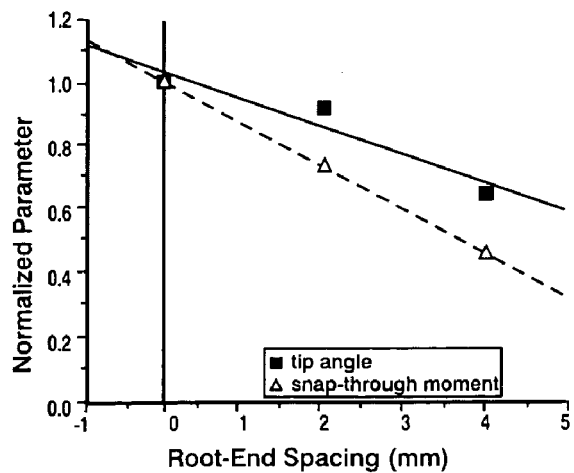
Figure 6D:
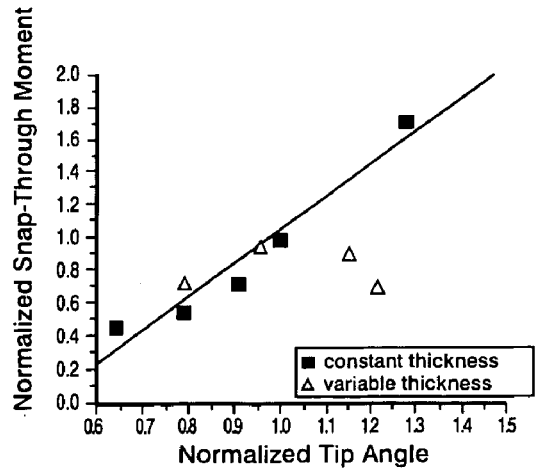

As with the composite modeling, a parametric study was done with steel devices to determine how modifying some of the input values would affect the tip-angle and snap-through moment of the devices. The same three geometric parameters were varied: the curvature of the individual cylindrical shells, the thickness of the shells, and the root-end spacing. However, these parameters were all independent for the steel devices. The modified values that were used in this parametric study are shown in Table III, and results from the study are presented in FIGS. 6A-6D, where all values except the root-end spacing are normalized by the steel baseline values. As with FIGS. 5A-5D, the symbols represent the values found from the individual runs of the analysis, and, where the trend was consistent, a linear-fit line is included as a way to help visualize the trend. As shown in FIG. 6A, increasing the curvature, i.e., decreasing the radius of curvature, of the uncombined cylindrical shells linearly increased the tip-angle and the snap-through moment. The effects of changing the shell thickness on the tip-angle and snap-through moment are shown in FIG. 6B. The tip-angle decreased fairly linearly with increasing thickness. However, the relationship between snap-through moment and thickness did not show a consistent trend. Instead, the snap-through moment initially increased with increasing thickness, but then decreased as the thickness continued to increase. It appeared that the snap-through moment had a maximum near the baseline thickness. In FIG. 6C, it is apparent that both the normalized tip-angle and normalized snap-through moment decreased with increasing root-end spacing. Finally, in FIG. 6D, the normalized snap-through moment is plotted against the normalized tip-angle for all of the steel cases. The square symbols represent all of the cases that used the baseline thickness, and the triangles represent the cases with other than the baseline thickness. When the thickness was held constant, the relationship between snap-through moment and tip-angle was fairly linear with increasing tip-angle leading to increased snap-through moment. However, there was not a clear relationship between the snap-though moment and the tip-angle if the shell thicknesses were changed.

A comparison of FIGS. 5 and 6 shows many similarities between the effect of geometric parameter changes on the composite and steel devices, and allows more observations to be made about the shape and performance of the bistable twisting devices. Looking first at FIGS. 5D and 6D, the tip-angle is a fairly good indicator of the snap-through moment, provided the thickness is not varied. Because the device with the greater tip-angle would need to be deformed more in order to effect the snap-through, changing a parameter to increase the tip-angle would tend to increase snap-through moment. However, because the relationship is fairly linear, it should be easier to tailor the behavior of such devices. If it is desired to change the snap-through moment without changing the tip-angle, the shell thickness can be changed. For the composite devices, if the unassembled shell curvatures were held fixed as the laminate thickness was changed, tip-angle remained constant, and the snap-through moment changed in a basically linear way (FIG. 5B). Unfortunately, for the steel devices, the relationship is not as simple (FIG. 6B). When FIGS. 5A and 5C are compared with FIGS. 6A and 6C, it is apparent that the changes in the curvature and the root-end spacing affect the composite devices and the steel devices in similar ways. In particular, the tip-angle and snap-through moment increase with increasing shell curvature, and decrease with increasing root-end spacing. This last effect, dealing with the root-end spacing, could prove very useful in service. All of the parameter changes (curvature and thickness) except the root-end spacing are fixed when the device is constructed, so they cannot be used to vary the stable configurations or the response of a single device. However, a method of varying the root-end spacing could be implemented in a design where these devices would be used. This would allow one to make use of the advantages of the multistable device, yet still allow for a continuous variation in the shape of that device.

The advantages of the present invention are numerous. Statically stable shapes are the operational shapes, and power to the actuation systems is only required when transforming the device from one shape to another. However, there are many other advantages to this type of structure: the idea and design are mechanically simple, and large shape change can be accomplished without complicated actuator systems such as screws, gears, or hydraulics. In addition, there is a large change in shape with small energy input, and power is only needed to transform the structure from one shape to another. The shape can be fine tuned with a continuous application of power, or a change in the root-end spacing.

Devices such as this could find use in many applications, the most obvious being aerodynamic applications such as for morphing wings or rotor blades, or for trailing-edge control surfaces for the same. Because the structure can serve as both the base structure and the control surface, there can be a reduction in overall system weight, which is an important consideration in aerodynamic applications. These devices could also be used near the hub on a rotor blade to change the angle of attack of the entire blade, or in a fan where it is desirable to change the direction of airflow without changing the direction of rotation of the shaft. The devices could be used in airflow controllers for vortex generation over an airfoil or in an intake manifold for an engine, autotwist blades or louvers, amplified motion structure for peizoelectric sensing/voltage generation, or even a child's plaything.

Although the invention has been described relative to specific embodiments thereof, there are numerous variations and modifications that will be readily apparent to those skilled in the art in light of the above teachings. For example, although the illustrative embodiments consisted of sharp leading and trailing edges, an insert could be used to create a more blunt leading edge like most common airfoils. Also, the structure could be encapsulated in a flexible elastic sheet if it were necessary to prevent the sliding surfaces from separating. The idea could also be scaled up or down, and different materials could be used.

The invention claimed is:

1. A multistable device, comprising:
   two similar-shape shells, each having a cylindrical shape;
   said shells each having a first and second set of opposing edges;
   said first set of opposing edges aligned such that they touch along the length thereof;
   said second set of opposing edges connected such that some portion thereof may move relative to one another;

a means to effect transformation of said device from a first stable shape to at least a second stable shape.

2. The device of claim 1, wherein said multistable device comprises at least two stable shapes having a difference in axial twist.

3. The device of claim 1, wherein said shells are aligned such that each is convex outward.

4. The device of claim 1, wherein said shells are anisotropic.

5. The device of claim 1, wherein said shells are laminates.

6. The device of claim 5, wherein said laminates are unsymmetric.

7. The device of claim 5, wherein said laminates are cross-ply.

8. The device of claim 5, wherein each said laminate comprises two layers of unidirectional graphite/epoxy, one layer having a 0° fiber angle and one layer having a 90° fiber angle.

9. The device of claim 5, wherein said cylindrical shape is induced by asymmetric stacking sequence and thermally induced stresses.

10. The device of claim 1, wherein said shells are isotropic.

11. The device of claim 10, wherein said shells are steel.

12. The device of claim 2, wherein said two stable shapes are a positive twist curvature and a negative twist curvature.

13. The device of claim 1, wherein said second set of opposing edges are connected such that each shell may rotate in plane relative to the other shell.

14. The device of claim 1, wherein said second set of opposing edges are connected such that the two shells are fixed on one end but may slide relative to one another on the other end.

15. The device of claim 13, wherein said second set of opposing edges comprises a means for fixing the approximate middle of each said edge.

16. The device of claim 14, wherein said fixed end comprises a means for fixing the entire length thereof.

17. The device of claim 15, wherein said means for fixing is selected from the group consisting of rivet, pin, bolt, screw, and compliant adhesive.

18. The device of claim 16, wherein said means for fixing is selected from the group consisting of adhesive, clamp and weld.

19. The device of claim 1, wherein said means to effect transformation is one or more actuators fixed on at least one said shell.

20. The device of claim 1, wherein said means to effect transformation is one or more actuators fixed on at least one end of said shells.

21. The device of claim 19, wherein said one or more actuators is selected from the group consisting of piezoelectric, shape memory alloy, magnetostrictive, ferroelectric, shape memory polymer and electroactive polymer.

22. The device of claim 20, wherein said one or more actuators is selected from the group consisting of piezoelectric, shape memory alloy, magnetostrictive, ferroelectric, shape memory polymer and electroactive polymer.

23. The device of claim 21, wherein said piezoelectric actuator is selected from the group consisting of piezoceramic, piezocomposite and piezopolymer.

24. The device of claim 22, wherein said piezoelectric actuator is selected from the group consisting of piezoceramic, piezocomposite and piezopolymer.

25. The device of claim 1, wherein said means to effect transformation is hydraulic or motor.

26. The device of claim 1, wherein said shells are rectangular.

27. The device of claim 1, further comprising means to vary the spacing between said second set of opposing edges.

* * * * *